US009081230B2

(12) United States Patent
Huang et al.

(10) Patent No.: US 9,081,230 B2
(45) Date of Patent: Jul. 14, 2015

(54) LIQUID CRYSTAL DISPLAYS WITH REDUCED LIGHT LEAKAGE

(71) Applicant: Apple Inc., Cupertino, CA (US)

(72) Inventors: Yi Huang, Santa Clara, CA (US); Pongpinit Towashiraporn, Cupertino, CA (US); Erik A. Zweigle, San Jose, CA (US); Mingxia Gu, San Jose, CA (US); Wei Chen, Palo Alto, CA (US); Cheng Chen, San Jose, CA (US); Young Cheol Yang, Sunnyvale, CA (US); Isaac V. Kauvar, Denver, CO (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 13/887,904

(22) Filed: May 6, 2013

(65) Prior Publication Data

US 2014/0327861 A1 Nov. 6, 2014

(51) Int. Cl.

*G02F 1/1333* (2006.01)
*G02F 1/13363* (2006.01)
*G02F 1/1335* (2006.01)
*G02F 1/01* (2006.01)

(52) U.S. Cl.

CPC .......... *G02F 1/13363* (2013.01); *G02F 1/0131* (2013.01); *G02F 1/1333* (2013.01); *G02F 1/133305* (2013.01); *G02F 1/133528* (2013.01); *G02F 1/133634* (2013.01); *G02F 2202/40* (2013.01)

(58) Field of Classification Search

CPC .......... G02F 1/13363; G02F 1/133634; G02F 1/1333; G02F 1/133305

USPC .......................................... 349/158, 117, 119

See application file for complete search history.

(56) References Cited

U.S. PATENT DOCUMENTS

| | | | |
|---|---|---|---|
| 7,352,423 B2 | 4/2008 | Lee et al. |
| 7,675,594 B2 | 3/2010 | Lee et al. |
| 8,274,627 B2 | 9/2012 | Tomonaga et al. |
| 2006/0270084 A1 | 11/2006 | Kimura |
| 2013/0077023 A1 | 3/2013 | Do et al. |

OTHER PUBLICATIONS

Ong, "Multicolor Parallel-Oriented Nematic Liquid Crystal Displays Using Optical Compensation Films", IBM Technical Disclosure Bulletin, vol. 33, No. 12, May 1, 1991. (2 pages).

*Primary Examiner* — Phu Vu

(74) *Attorney, Agent, or Firm* — Treyz Law Group; Michael H. Lyons

(57) ABSTRACT

A display is provided that has upper and lower polarizers, a color filter layer, a liquid crystal layer, and a thin-film transistor layer. The color filter layer and thin-film transistor layer may be formed from materials such as glass that are subject to stress-induced birefringence. To reduce light leakage that reduces display performance, one or more birefringence compensation layers may be incorporated into the display to help compensate for any birefringence effects. The compensation layers may include a birefringence compensation layer attached to the color filter layer or the thin-film transistor layer. A display may include an upper compensation layer attached to the color filter layer and a lower compensation layer attached to the thin-film transistor layer. The compensation layer may be formed from glass or polymer materials that have a negative photo-elastic constant.

22 Claims, 12 Drawing Sheets

LIQUID CRYSTAL DISPLAYS WITH REDUCED LIGHT LEAKAGE

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. In some mounting configurations, standoffs, housing walls, display bezels and other structures may press against a display, leading to bending. If care is not taken, optical effects such as stress-induced birefringence may cause a display to exhibit undesired light leakage when the display is in a dark state.

It would therefore be desirable to be able to provide improved displays for electronic devices.

SUMMARY

An electronic device may be provided with a display. The display may have upper and lower polarizers. A color filter layer, a liquid crystal layer, and a thin-film transistor layer may be interposed between the upper and lower polarizers. A backlight unit may provide backlight that passes through the layers of the display.

The color filter layer and thin-film transistor layer may be formed from materials such as glass that are subject to stress-induced birefringence when the display is mounted in a housing for the electronic device. Light leakage may be reduced by incorporating one or more internal layers into the display between the upper and lower polarizers to help ensure that linearly polarized backlight that passes through the display is not undesirably converted into elliptically polarized light.

The internal layers of the display may include one or more birefringence compensation layers. A birefringence compensation layer may be a transparent display layer that generates a change in polarization that compensates for corresponding changes in polarization that are generated by other layers of the display.

The birefringence compensation layer may be a glass layer having a photo-elastic constant that is opposite in sign to the photo-elastic constant of the thin-film transistor layer and/or the photo-elastic constant of the color filter layer. A birefringence compensation layer of this type may be attached to the thin-film transistor layer or the color filter layer using adhesive such as optically clear adhesive. However, this is merely illustrative.

In another embodiment, the birefringence compensation layer may be formed from a polymer material such as a polystyrene film. The polystyrene film may be bonded to or coated onto one or both of the color filter layer and the thin-film transistor layer.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
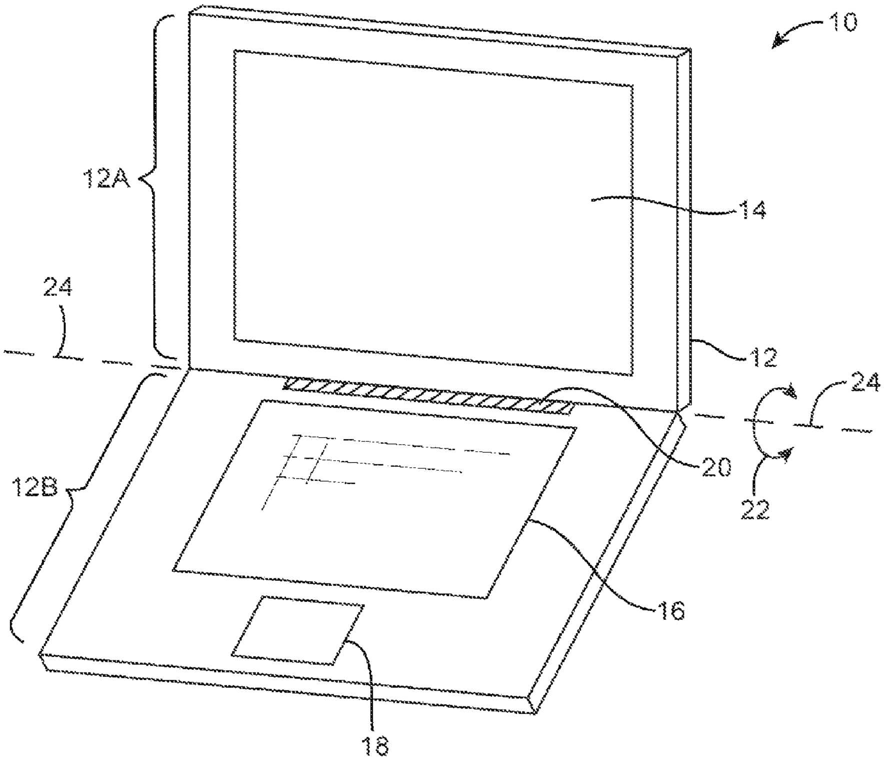
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
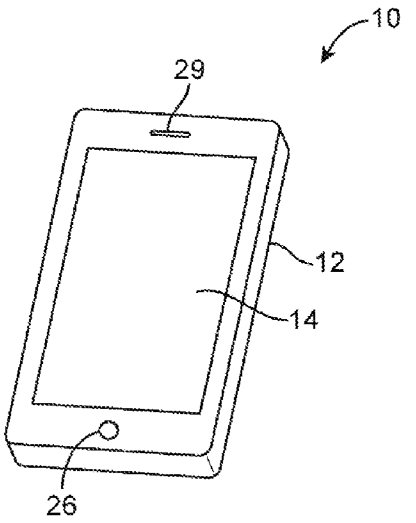
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 29 of FIG. 2).

Figure 3:
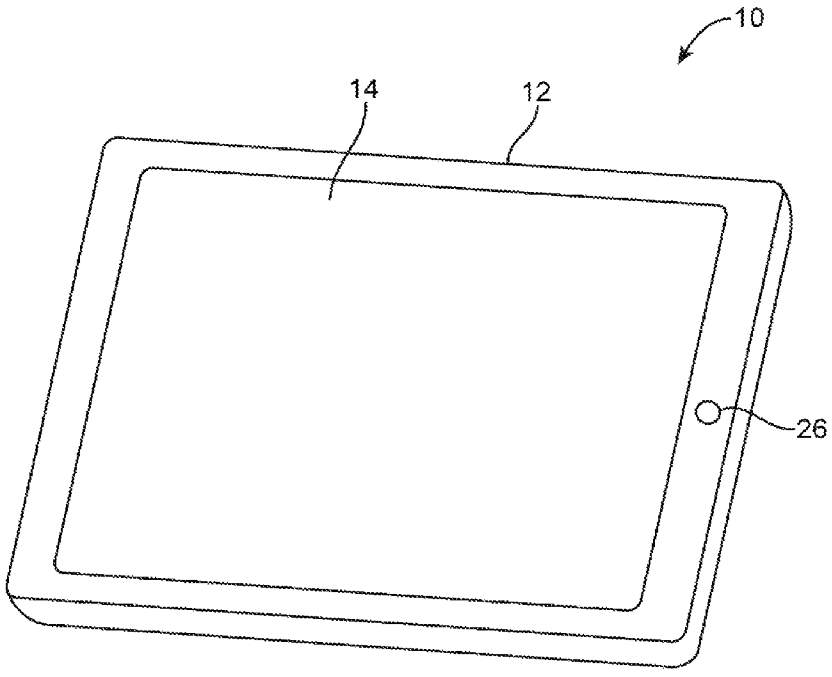
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
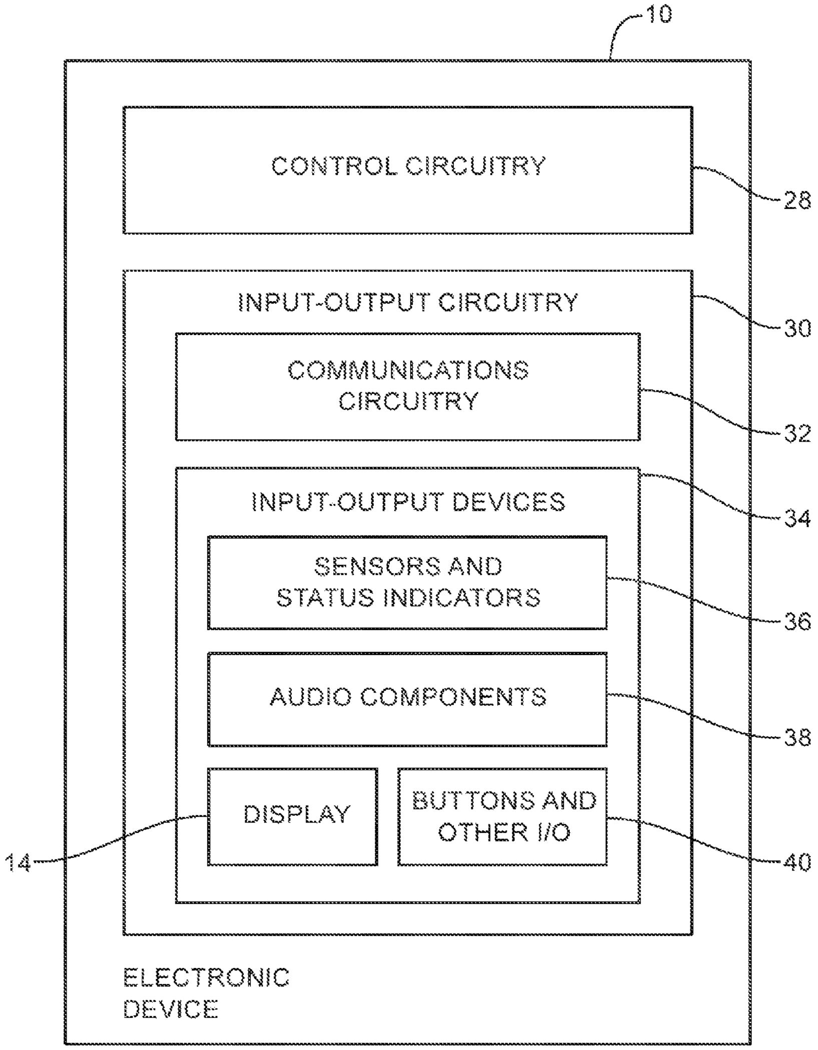
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 28. Control circuitry 28 may include storage and processing circuitry for controlling the operation of device 10. Control circuitry 28 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 28 may include processing circuitry based on one or more microprocessors, microcontrollers, digital signal processors, baseband processors, power management units, audio codec chips, application specific integrated circuits, etc.

Control circuitry 28 may be used to run software on device 10, such as operating system software and application software. Using this software, control circuitry 28 may present information to a user of electronic device 10 on display 14. When presenting information to a user on display 14, sensor signals and other information may be used by control circuitry 28 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
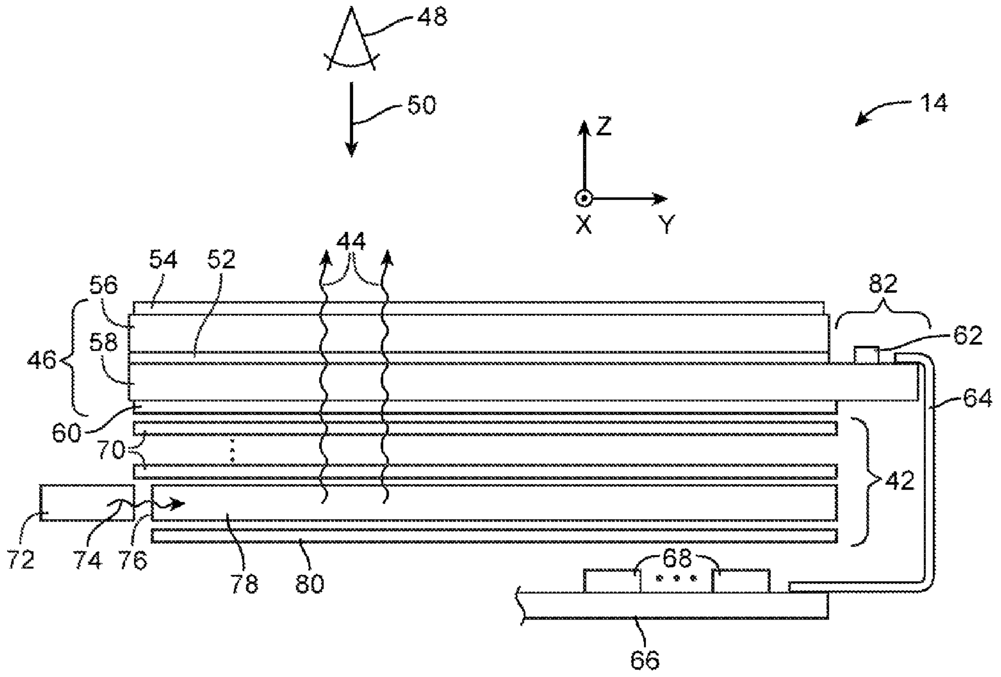
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 28 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film transistor layer driver ledge 82 or elsewhere in device 10. A flexible printed circuit cable such as flexible printed circuit 64 may be used in routing signals between printed circuit 66 and thin-film transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

When display 14 is mounted in a housing, the layers of display 14 such as thin-film transistor layer 58 and color filter layer 56 (e.g., the glass layers of the display) may be subjected to stresses. Stress may be imparted by bending the layers of display 14 when display 14 is mounted within housing 12 (e.g., using standoffs, housing walls, internal frame structures, display bezels, adhesive, and other mounting and support structures). The optical behavior of the layers of display 14 when bent depends on the type of materials used in forming the display layers.

Figure 6:
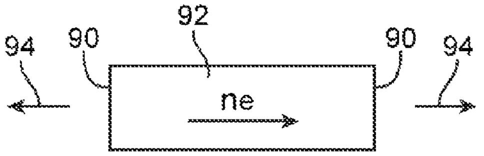
FIG. 6 is a cross-sectional side view of a display layer such as a layer of glass in a thin-film transistor layer or color filter layer showing how stress-induced birefringence may be generated upon application of tensile stress to the layer of glass.

As shown in FIG. 6, when a glass layer such as glass layer 92 is subjected to tensile stress by pulling ends 90 of glass layer 92 in opposing outward directions 94, the glass layer may exhibit birefringence so that the optical axis (extraordinary axis) of the glass runs parallel to the direction of stress (i.e., horizontally within the page in the orientation of FIG. 6). The ordinary axis of the glass layer may run perpendicular to the optical axis in the plane of glass layer 92.

Figure 7:
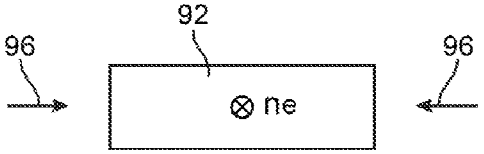
FIG. 7 is a cross-sectional side view of a display layer such as a layer of glass in a thin-film transistor layer of color filter layer showing how stress-induced birefringence may be generated upon application of compressive stress to the layer of glass.

As shown in FIG. 7, when a glass layer such as glass layer 92 is subjected to compressive stress by pushing ends 90 of glass layer 92 in opposing inward directions 96, the glass layer may exhibit birefringence so that the optical axis (extraordinary axis) of the glass runs parallel to the direction of stress (i.e., into the page in the orientation of FIG. 6). The ordinary axis may run perpendicular to the extraordinary axis in the plane of layer 92.

Figure 8:
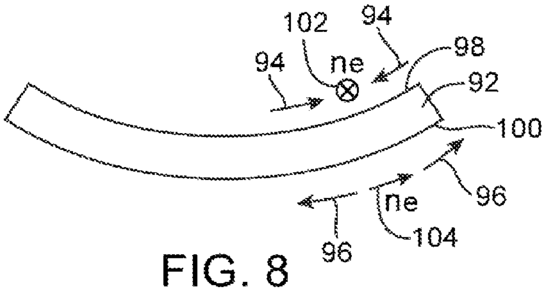
FIG. 8 is a cross-sectional side view of a layer of material such as a layer of glass that has been subjected to bending and that exhibits stress-induced birefringence in a display.

A bent layer of glass such as glass layer 92 of FIG. 8 may exhibit compressive stress along top surface 98 (e.g., near the edge of glass layer 92) and may exhibit tensile stress along lower surface 100. As a result, glass layer 92 may be characterized by an optical axis such as optical axis 102 that extends into the page of FIG. 8 along upper surface 98 and an optical axis such as optical axis 104 that extends parallel to the page of FIG. 8 along lower surface 100.

Figure 9:
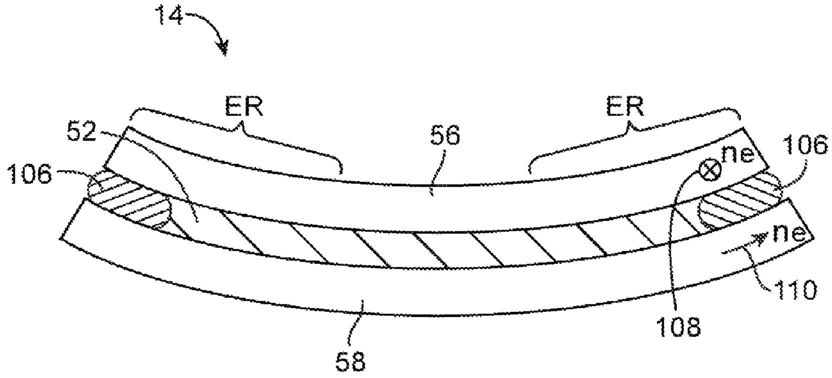
FIG. 9 is a cross-sectional side view of a display with layers of glass that have been subjected to bending due to forces imparted by mounting the display in a device housing in accordance with an embodiment of the present invention.

As shown in FIG. 9, when the layers of display 14 such as color filter layer 56 and thin-film transistor layer 58 are mounted in device housing 12, these layers may become bent (e.g., from forces introduced when mounting display 14 in housing 12). The bending of layers 56 and 58 may give rise to stress-induced birefringence. If care is not taken, this birefringence can adversely affect the performance of a display by causing light leakage in a display dark state when the display is viewed by a user.

Layers 56 and 58 may be glass layers or layers of other material with optical characteristics of the type described in connection with FIGS. 6, 7, and 8. A layer of sealant such as sealant 106 (e.g., a bead of adhesive) may be interposed between color filter layer 56 and thin-film transistor layer 58. Sealant 106 may run around the periphery of display 14 in a rectangular ring and may surround and enclose liquid crystal material 52. The presence of sealant 106 may bond layers 52 and 58, so that layers 52 and 58 act as a single body in the bending. Since the neutral axis of layer 52 and 58 is at the center of sealant 106, when bent as shown, layer 52 has a net compressive stress while layer 56 has a net tensile stress. These net stresses may cause optical axis 108 of layer 56 near the edge of layer 56 (e.g., in edge region ER) to point into the page of FIG. 9 and may cause optical axis 110 of layer 58 near the edge of layer 58 (e.g., in edge region ER) to lie in the plane of layer 58 (lying within the page and pointing to the right in the example of FIG. 9). The perpendicular optical axes of layers 58 and 56 (particularly prevalent in edge regions ER) may lead to changes in the polarization state of backlight passing through these layers that cause light leakage in conventional displays.

Figure 10A:
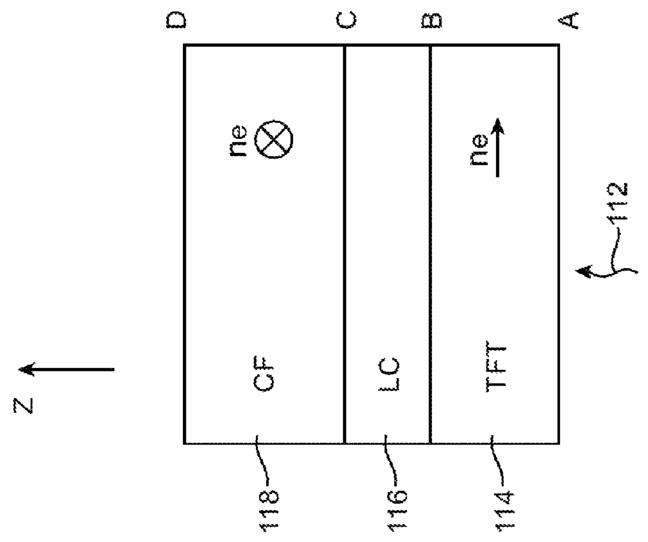
FIG. 10A is a cross-sectional diagram of display layers in a conventional liquid crystal display.

FIG. 10A is a cross-sectional side view of a conventional display having glass layers that may be subject to stress-induced birefringence. As shown in FIG. 10, the display of FIG. 10A is a liquid crystal display in which liquid crystal layer 116 is sandwiched between thin-film transistor layer 114 and color filter layer 118. The display has upper and lower polarizers located respectively above and below the layers of FIG. 10. A backlight may generate backlight 112 that travels vertically upwards through the display in direction Z. Upon passing through the lower polarizer (i.e., at point A of FIG. 10), backlight 112 may be linearly polarized (i.e., the lower polarizer may impart a linear polarization on backlight 112). The polarization of light 112 may then be affected by passing from point A to point B through thin-film transistor layer 114 (which is exhibiting stress-induced birefringence), by passing from point B to point C through liquid crystal 116 (which is birefringent), and by passing from point C to point D through color filter layer 118 (which is exhibiting stress-induced birefringence). The upper and lower polarizers in the display do not typically exhibit stress-induced birefringence and are not shown in FIG. 10A.

Figure 10B:
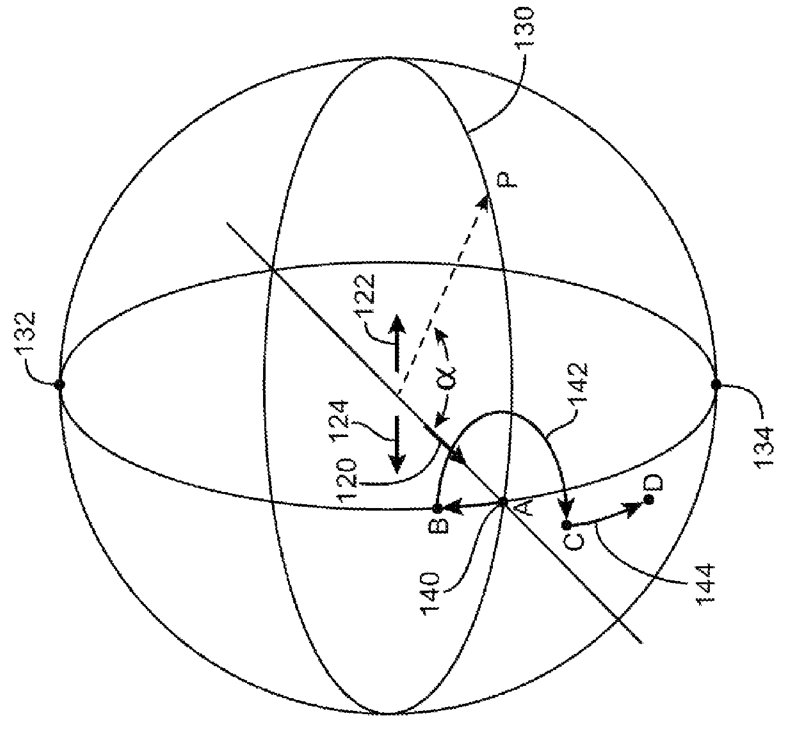
FIG. 10B is a Poincare sphere showing how the polarization of backlight may vary when passing through the conventional display layers of FIG. 10A when the layers are subject to stress-induced birefringence.

The polarization state of backlight 112 as backlight 112 travels through the layers of the conventional display of FIG. 10A is illustrated in the Poincare sphere of FIG. 10B. In a Poincare sphere, linear polarization states are represented by points on equatorial line 130. Point 132 represents right-hand circularly polarized light. Point 134 represents left-hand circularly polarized light. Intermediate points on the Poincare sphere represent various types of elliptically polarized light.

Each of the layers of FIG. 10A has an optical axis that is aligned in a different direction. In the Poincare sphere representation of FIG. 10B representing portions of the display in which light leakage occurs, thin-film transistor layer 114 is characterized by optical axis 122, color filter layer 118 is characterized by optical axis 124, and liquid crystal layer 116 is characterized by optical axis 120. However, this is merely illustrative. Optical axis 120 may represent an e-mode optical axis for a liquid crystal display such as an in-plane-switching (IPS) LCD display or a fringe-filed-switching (FFS) LCD display. However, other LCD modes may be used. The LCD optical axis may be different for other LCD modes.

On the Poincare sphere, azimuthal angle $\alpha$ of a vector to each point P on equatorial line 130 is equal to $2\theta$, where $\theta$ is equal to an actual physical angle (e.g., an azimuthal angle in real space that is associated with the orientation of an optical axis for a display layer or an angle associated with the polarization of light such as light 112 that is passing through the display). As a result, a pair of axes such as thin-film transistor axis 122 and liquid crystal layer axis 120 that appear to be perpendicular to each other in the Poincare sphere representation of FIG. 10B are, within the real-life coordinate system of the display, oriented at a 45° angle with respect to each other. Similarly, a pair of axes such as thin-film transistor axis 122 and color filter layer axis 124 that appear to be separated by 180° in the Poincare sphere representation of FIG. 10B are, within the real-life coordinate system of the display, oriented at a 90° angle with respect to each other (i.e., axis 124 is perpendicular to axis 122).

The behavior of the polarization of light 112 is affected by the orientation of each optical axis and the thickness of each layer in the display of FIG. 10A. As shown in FIG. 10B, light 112 is initially linearly polarized (point A). Following passage through layer 114, the polarization of light 112 is represented by point B on the Poincare sphere of FIG. 10B (i.e., light 112 is transformed from linearly polarized light to elliptically polarized light due to the stress-induced birefringence of layer 114). Visually, the transition from point A to point B along line 140 on the surface of the Poincare sphere is associated with rotation of point A about thin-film transistor layer optical axis 122 on the surface of the sphere. Following passage of light 112 through layer 114, light 112 passes through liquid crystal layer 116. Layer 116 causes the polarization of light 112 to move from point B to point C along line 142 on the Poincare sphere of FIG. 10B (rotating about liquid crystal layer optical axis 120).

After traveling through liquid crystal layer 116, light 112 passes through layer 118. The birefringence of layer 118 causes the polarization of light 112 to change from the polarization state represented by point C to the polarization state represented by point D along line 144 of the Poincare sphere of FIG. 10B (rotating about color filter layer optical axis 124).

If liquid crystal layer 116 had not been present, the polarization state changes associated with lines 144 and 140 would have canceled each other out, resulting in minimal changes to the linear polarization of light 112 (i.e., light 112 would have remain linearly polarized with a polarization state represented by point A and the display would have operated satisfactorily). Because of the presence of liquid crystal layer 116 and the associated transition of the polarization state of light 112 from point B to point C, however, light 112 at point D (i.e., light 112 exiting the upper surface of color filter layer 118 of FIG. 10A) is substantially elliptically polarized, rather than being linearly polarized as desired. When this elliptically polarized light passes through the upper polarizer whose transmission axis is perpendicular to the lower polarizer, the fact that the light is not linearly polarized in a direction perpendicular to the upper polarizer, as expected, allows some of the light to leak out from the upper surface of the display through the upper polarizer, even when the electric field being applied to liquid crystal layer 116 is attempting to display a black display pixel. Display performance in conventional displays is therefore limited by the inability of conventional displays to satisfactorily display black images in the presence of stress-induced birefringence in the layers of the display.

Illustrative display configurations with designs that address the shortcomings of conventional displays in handling stress-induced birefringence are shown in FIGS. 11A, 12, 13A, 14, 15A, and 16.

Figure 11B:
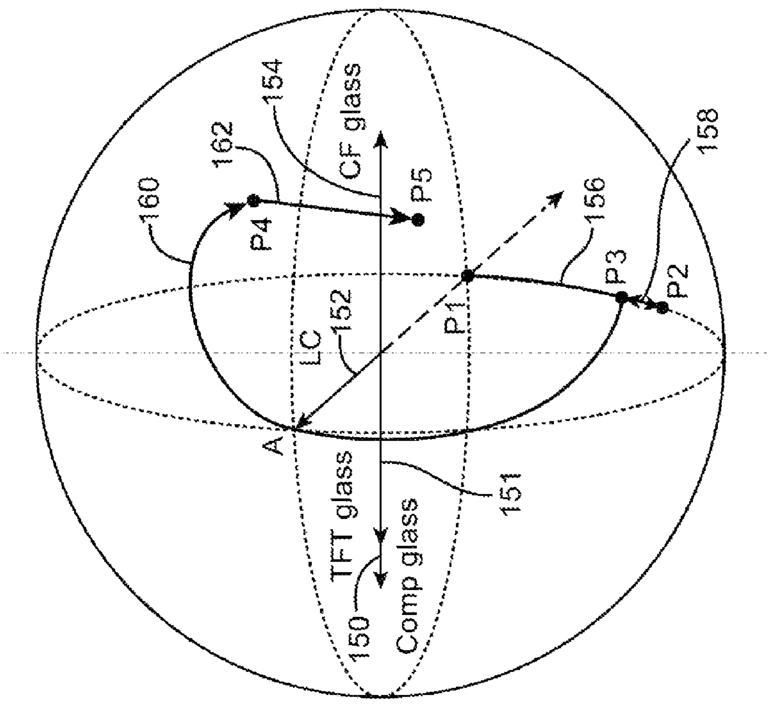
FIG. 11B is a Poincare sphere showing how the polarization of backlight may vary when passing through the display layers of FIG. 11A in the presence of stress-induced birefringence in some of the layers in accordance with an embodiment of the present invention.
Figure 11A:
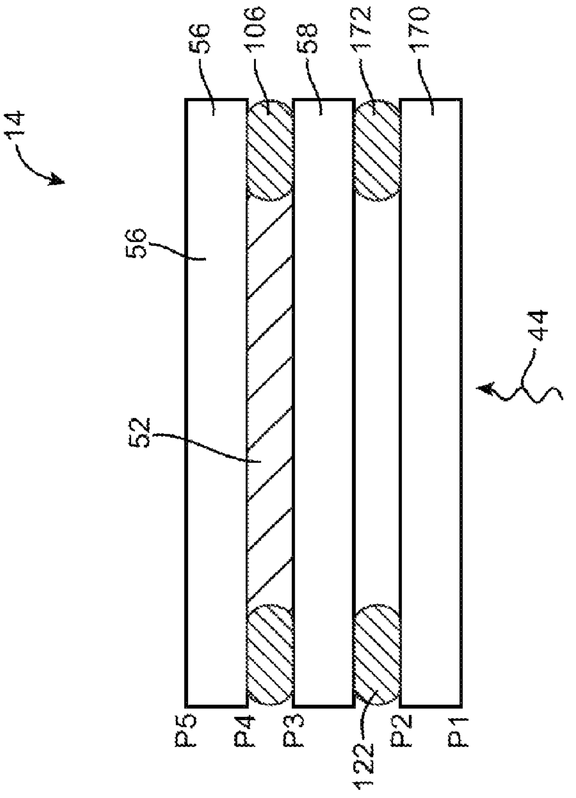
FIG. 11A is a cross-sectional diagram of display layers in a liquid crystal display with a birefringence compensation layer that helps to reduce light leakage due to stress-induced birefringence in accordance with an embodiment of the present invention.

As shown in the example of FIG. 11A, display 14 may be provided with a birefringence compensation layer such as layer 170. Birefringence compensation layer 170 may be formed from a material having a photo-elastic constant that is opposite in sign to the photo-elastic constants of TFT glass 58 and color filter (CF) glass 56. Compensation layer materials having relatively higher magnitude photo-elastic constants may be used in order to reduce the thickness of compensation layer 170.

For example, TFT glass 58 and color filter glass 56 may have a photo-elastic constant of between 3.0 and 3.6 Brewster. In this type of configuration, birefringence compensation layer 170 may be formed from glass having a photo-elastic constant between −3.0 and −3.6 Brewster (as an example). Compensation layer 170 may be a glass layer having a thickness of between 0.1 mm and 0.9 mm, between 0.2 mm and 0.4 mm, between 0.1 mm and 0.4 mm, less than 1 mm, or greater than 0.1 mm (as examples). TFT glass 58 and color filter glass 56 may each have a thickness of between 0.1 mm and 0.9 mm, between 0.5 mm and 0.9 mm, between 0.6 mm and 0.8 mm, less than 1 mm, or greater than 0.1 mm (as examples).

Compensation layer 170 may be a glass layer having a thickness that is substantially equal to the thickness of layer 56 and/or substantially equal to the thickness of layer 58. However, this is merely illustrative. If desired, compensation layer 170 may be a glass layer having a thickness that is different from the thickness of layers 56 and/or 58 or compensation layer 170 may be formed from a material other than glass such as a polymer material (e.g., a polystyrene film, a polysulfone material, or a thermoplastic polymer such as polymethyl methacrylate (PMMA)).

In configurations in which layer 170 is formed from a material other than glass, layer 170 be a polymer birefringence compensation layer having a thickness between 0.001 microns and 300 microns, between 0.001 microns and 10 microns, between 0.001 microns and 100 microns, between 10 microns and 300 microns, greater than 0.001 microns, less than 1000 microns, or between 100 microns and 300 microns (as examples). The thickness of layer 170 may be chosen based on the photo-elastic constant of the polymer material and the Young's modulus of the polymer material as well as the thickness of TFT layer 58 and color filter layer 56.

Birefringence compensation layer 170 may have other properties such as a Young's modulus. Birefringence compensation layer 170 may have a thickness, a Young's modulus, and a photo-elastic constant (sometimes referred to as a stress-optic constant) that are chosen so that, under stress, layer 170 causes a change in polarization of light such as light 44 that compensates for changes in the polarization of light 44 by layer 56 and/or layer 58.

The layers of display 14 that are shown in FIG. 11A may be sandwiched between upper and lower polarizers (not shown in FIG. 11A) such as upper polarizer 54 and lower polarizer 60. In the example of FIG. 11A, compensation layer 170 is attached to a surface TFT substrate 58 using adhesive 172. Adhesive 172 may be formed from the same material as adhesive sealant 106 or may be formed from another adhesive material. Adhesive 172 may run around the periphery of display 14 in a rectangular ring between compensation layer 170 and thin-film transistor layer 58. The presence of adhesive 172 may cause tensile stress on compensation layer 170 to be similar to any tensile stress on layer 58. In this way, birefringence effects generated by compensation layer 170 may at least partially counteract birefringence effects generated by thin-film transistor layer 58.

The behavior of the polarization of display backlight such as light 44 is affected by the orientation of each optical axis, the photo-elastic constant, and the thickness of each layer in display 14. Optical axis 150 of FIG. 11B may be associated with thin-film transistor layer (TFT glass) 58, which may exhibit stress-induced birefringence. Optical axis 152 of FIG. 11B may be associated with the liquid crystal (LC) layer 52. Optical axis 151 of FIG. 11B may be associated with birefringence compensation layer 170, which may exhibit stress-induced birefringence. Optical axis 154 may be associated with color filter layer 56, which may exhibit stress-induced birefringence.

As shown in FIG. 11B, light 44 is initially linearly polarized (point P1). Following passage through birefringence compensation layer 170, the polarization of light 44 may be represented by point P2 on the Poincare sphere of FIG. 11B (i.e., light 44 may be transformed from linearly polarized light to elliptically polarized light due to the stress-induced birefringence of layer 170). The transition from point P1 to point P2 along line 156 on the surface of the Poincare sphere of FIG. 11B is associated with rotation about compensation layer (Comp glass) optical axis 151. Following passage of light 44 through layer 58, the polarization of light 44 may be represented by point P3. Because layer 170 has a photo-elastic constant that is substantially opposite to the photo-elastic constant of layer 58, the change in polarization of light 44 due to birefringence in layer 58 may undo some or all of the polarization change that occurred when light 44 passed through layer 170. The transition of the polarization state of light 44 from point P2 to P3 through layer 58 of FIG. 11A is represented by the transition from polarization state P2 to polarization state P3 in FIG. 11B along line 158.

Due to the presence of compensation layer 170, light 44 in polarization state P3 will be less elliptically polarized (more linearly polarized) upon passing through layers 52 and 56 than in conventional display arrangements. As shown in FIG. 11B, the transition of the polarization state of light 44 when traveling from point P3 to point P4 through liquid crystal layer 52 of FIG. 11A may be represented by line 160 and the transition of the polarization state of light 44 when traveling from point P4 to point P5 through color filter layer 56 may be represented by line 162. Although light 44 is elliptically polarized at point P5, light 44 at point P5 is more linearly polarized than conventional light at point D of FIGS. 10A and 10B, thereby reducing light leakage and improving the performance of display 14.

Figure 12:
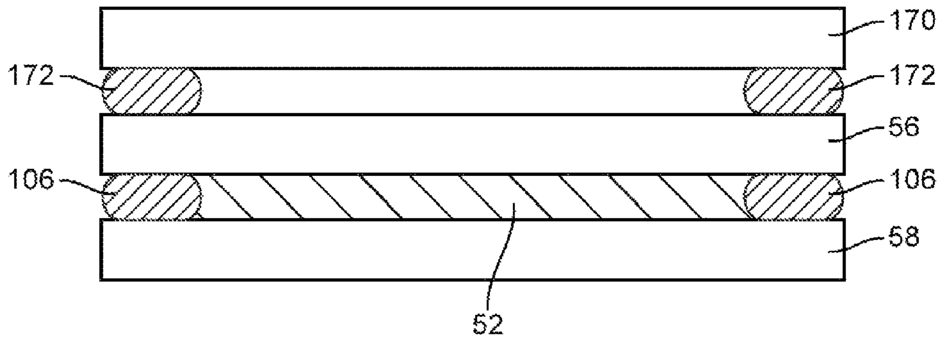
FIG. 12 is a cross-sectional diagram of display layers in a liquid crystal display with a birefringence compensation layer that is attached to a color filter layer in accordance with an embodiment of the present invention.

The example of FIG. 11A in which birefringence compensation layer 170 is attached to thin-film transistor layer 58 is merely illustrative. If desired, layer 170 may be attached to color filter layer 56 as shown in FIG. 12. As shown in FIG. 12, layer 170 may be attached to color filter substrate 56 using adhesive 172. In this type of configuration, adhesive 172 may run around the periphery of display 14 in a rectangular ring between compensation layer 170 and color filter layer 56. The presence of adhesive 172 may cause tensile stress on compensation layer 170 to be similar to any tensile stress on layer 56. In this way, birefringence effects generated by compensation layer 170 may at least partially counteract birefringence effects generated by layer 56 (as well as effects generated by layers 52 and 58).

Figure 13B:
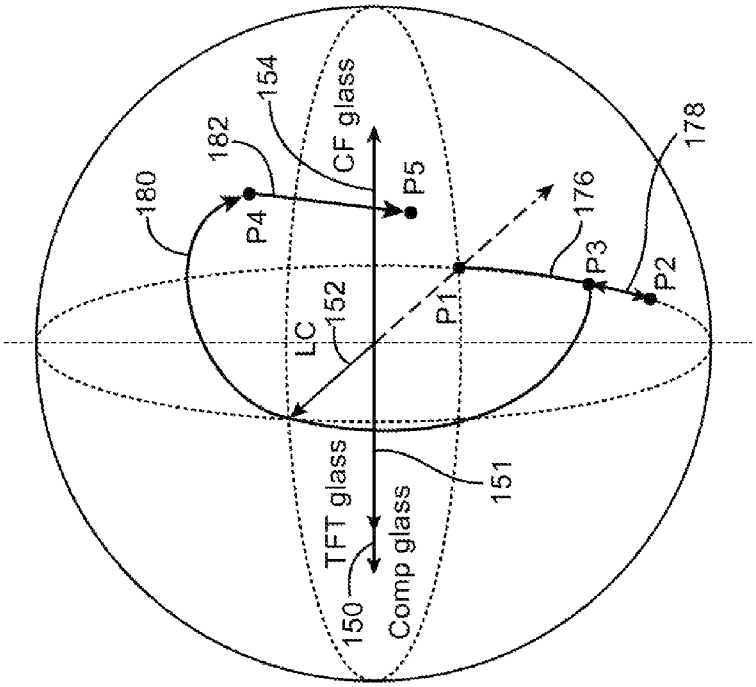
FIG. 13B is a Poincare sphere showing how the polarization of backlight may vary when passing through the display layers of FIG. 13A in the presence of stress-induced birefringence in some of the layers in accordance with an embodiment of the present invention.
Figure 13A:
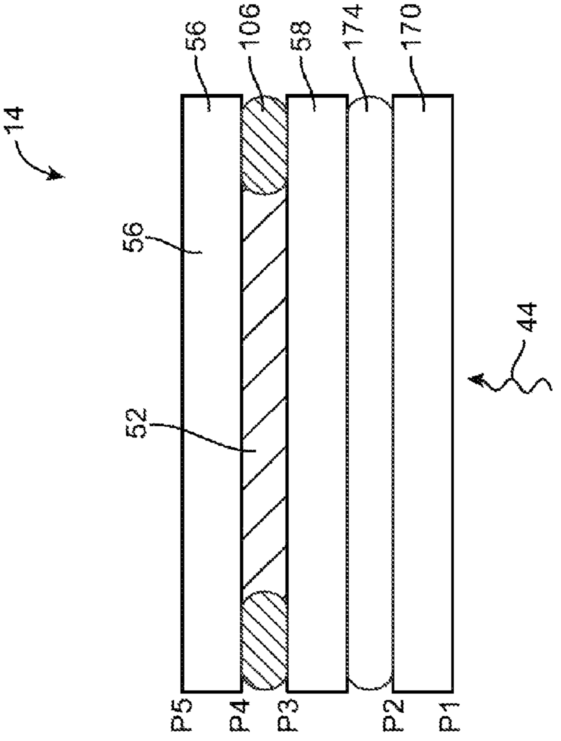
FIG. 13A is a cross-sectional diagram of display layers in a liquid crystal display with a birefringence compensation layer that is attached to a thin-film transistor layer using a layer of optically clear adhesive in accordance with an embodiment of the present invention.

FIG. 13A is a diagram of another illustrative configuration that may be used for the middle layers of display 14 between upper polarizer 54 and lower polarizer 60. As shown in FIG. 13A, compensation layer 170 may be attached to layer 58 using a layer of optically clear adhesive such as adhesive layer 174. Adhesive layer 174 may substantially fill the gap between layer 170 and layer 58 so that substantially all of the surface of layer 170 is attached to layer 58.

Adhesive layer 174 may, for example, be formed from a pressure sensitive adhesive. Adhesive 174 may be formed from a material having a strength of greater than 100 MPa or other suitable adhesive strength for transferring tensile stresses on layer 58 efficiently into matching stresses on layer 170.

As shown in FIG. 13B, light 44 is initially linearly polarized (as indicated by point P1 of FIG. 13B). Following passage through birefringence compensation layer 170, the polarization of light 44 may be represented by point P2 on the Poincare sphere of FIG. 13B. The transition from point P1 to point P2 along line 176 on the surface of the Poincare sphere of FIG. 13B is associated with rotation about compensation layer (Comp glass) optical axis 151.

Following passage of light 44 through adhesive layer 174 and thin-film transistor layer 58, the polarization of light 44 may be represented by point P3. The transition of the polarization state of light 44 when from point P2 to P3 through layer 58 of FIG. 13A is represented by the transition from polarization state P2 to polarization state P3 in FIG. 13B along line 178. Because layer 170 of FIG. 13A is attached to layer 58 by extended adhesive layer 174, the change in polarization of light 44 due to birefringence in layer 58 may be more closely compensated by the polarization change that occurred when light 44 passed through layer 170 than the compensation described above in connection with FIG. 11B.

As shown in FIG. 13B, the transition of the polarization state of light 44 when traveling from point P3 to point P4 through liquid crystal layer 52 of FIG. 13A may be represented by line 180 and the transition of the polarization state of light 44 when traveling from point P4 to point P5 through color filter layer 56 may be represented by line 182. Although light 44 may still be elliptically polarized at point P5, because layer 170 is attached to layer 58 along substantially the entire surface of layer 58, light 44 at point P5 of FIG. 13B may be more linearly polarized than light 44 at point P5 of FIG. 11B.

Figure 14:
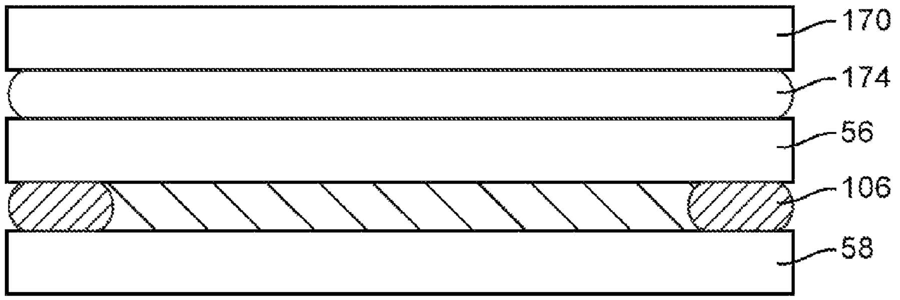
FIG. 14 is a cross-sectional diagram of display layers in a liquid crystal display with a birefringence compensation layer that is attached to a color filter layer using a layer of optically clear adhesive in accordance with an embodiment of the present invention.

The example of FIG. 13A in which birefringence compensation layer 170 is attached to thin-film transistor layer 58 using adhesive layer 174 is merely illustrative. If desired, adhesive layer 174 may attach layer 170 to color filter layer 56 as shown in FIG. 14. As shown in FIG. 14, adhesive layer 174 may substantially fill the space between compensation layer 170 and color filter layer 56, thereby attaching substantially all of the surface of layer 170 to the surface of layer 56. The presence of adhesive layer 174 may be more efficient at transferring tensile stress on layer 56 to compensation layer 170 than adhesive 172 of FIG. 12. The configuration of FIG. 14 for display 14 may therefore be more efficient at reducing light leakage from display 14 than conventional displays and may be more efficient at reducing light leakage than displays of the type shown in FIG. 12.

Figure 15B:
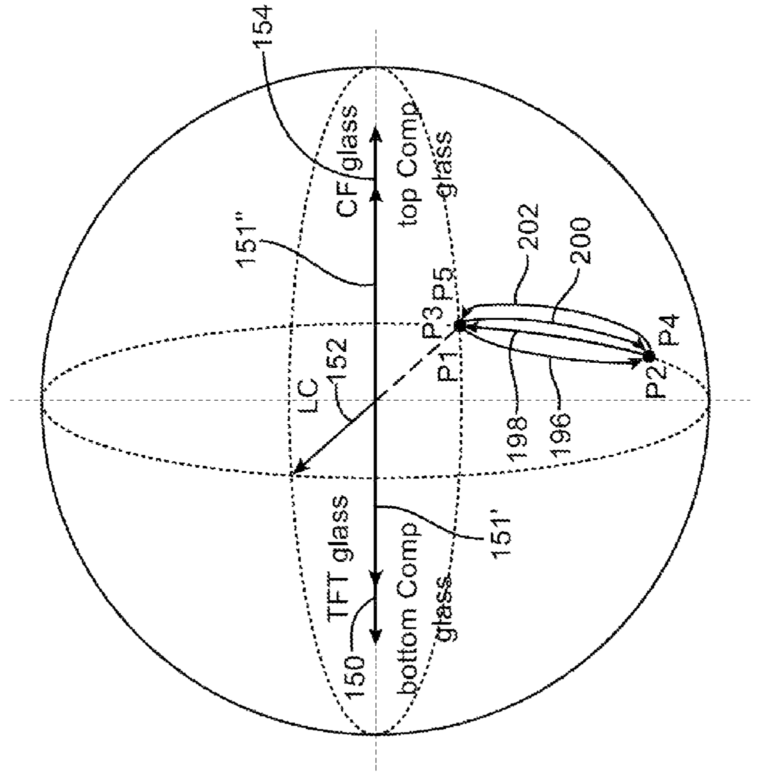
FIG. 15B is a Poincare sphere showing how the polarization of backlight may vary when passing through the display layers of FIG. 15A in the presence of stress-induced birefringence in some of the layers in accordance with an embodiment of the present invention.
Figure 15A:
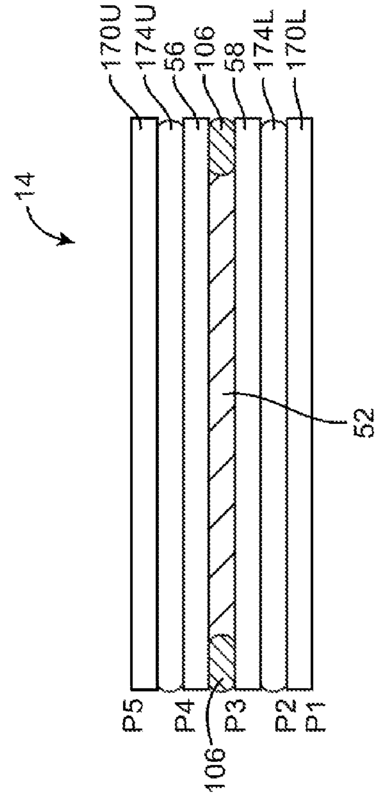
FIG. 15A is a cross-sectional diagram of display layers in a liquid crystal display with multiple birefringence compensation layers in accordance with an embodiment of the present invention.

If desired, display 14 may be provided with multiple birefringence compensation layers, as shown in FIG. 15A. In the example of FIG. 15A, display 14 includes lower birefringence compensation layer 170L and upper birefringence compensation layer 170U. Lower birefringence compensation layer 170L may be attached to thin-film transistor layer 58 using a lower adhesive layer such as adhesive layer 174L. Upper birefringence compensation layer 170U may be attached to color filter layer 56 using an upper adhesive layer such as adhesive layer 174U.

Birefringence compensation layers 174U and 174L may be formed from glass having a negative photo-elastic constant such as a photo-elastic constant between −3.0 and −3.6 Brewster, between 0 Brewster and −3.6 Brewster, between, −0.1 Brewster and −0.3 Brewster, between −0.1 Brewster and 3.0 Brewster, or less than zero Brewster (as examples). In general, the photo-elastic constant and the thickness of compensation layers 170L and 170U may be chosen in any suitable combination for compensating for birefringence effects due to stresses in layers 56 and 58. The layers of display 14 that are shown in FIG. 15A may be sandwiched between upper and lower polarizers (not shown in FIG. 15A) such as upper polarizer 54 and lower polarizer 60.

Lower adhesive layer 174L may substantially fill the gap between layer 170L and layer 58. Upper adhesive layer 174U may substantially fill the gap between layer 170U and layer 56. Adhesive layers 174U and 174L may, for example, be formed from adhesive material such as pressure sensitive adhesive. As examples, adhesive layers 174U and 174L may be pressure sensitive adhesives having a strength of between 190 MPa and 210 MPa, between 150 MPa and 250 MPa, greater than 150 MPa, greater than 190 MPa or other suitable adhesive strength. However, these examples are merely illustrative. If desired, any suitable adhesive material may be used to attach compensation layers 170L and 170U respectively to layers 58 and 56.

As shown in FIG. 15B, light 44 is initially linearly polarized (as indicated by point P1 of FIG. 15B). Following passage through lower birefringence compensation layer 170L, the polarization of light 44 may be represented by point P2 on the Poincare sphere of FIG. 15B. The transition from point P1 to point P2 along line 196 on the surface of the Poincare sphere of FIG. 15B is associated with rotation about bottom compensation layer (bottom Comp glass) optical axis 151'.

Following passage of light 44 through lower adhesive layer 174L and thin-film transistor layer 58, the polarization of light 44 may be represented by point P3. The transition of the polarization state of light 44 from point P2 to P3 through layer 58 of FIG. 15A is represented by the transition from polarization state P2 to polarization state P3 in FIG. 15B along line 198.

Because light at point P3 has passed through both thin-film transistor layer 58 and lower compensation layer 170L, light 44 may experience a minimal or negligible rotation when passing through liquid crystal layer 52. The transition of the polarization state of light 44 when traveling from point P3 to point P4 through color filter layer 56 of FIG. 15A may be represented by line 200. The transition of the polarization state of light 44 when traveling from point P4 to point P5 through upper birefringence compensation layer 170U may be represented by line 202 about top compensation layer (top Comp glass) optical axis 151". Because display 14 of FIG. 15A is provided with upper and lower birefringence compensation layers, light 44 at point P5 may be substantially linearly polarized, thereby reducing light leakage to negligible levels and improving the performance of display 14.

The examples of FIGS. 11A, 12, 13A, 14, and 15A in which birefringence compensation layers 170 are attached to layers 56 and/or 58 using adhesive are merely illustrative. If desired, birefringence compensation layers such as birefringence compensation layers 170U and 170L of FIG. 16 may be formed from a polymer coating or a bonded polymer material such as a polystyrene film that is coated or laminated to layers 56 and/or 58.

Figure 16:
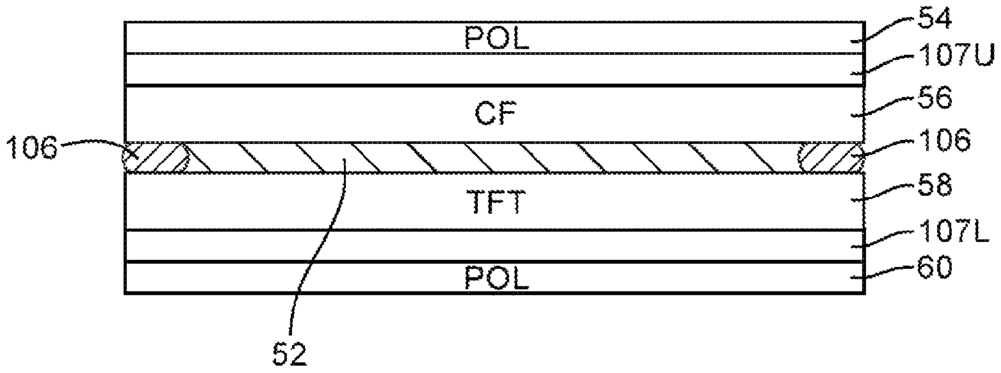
FIG. 16 is a cross-sectional diagram of display layers in a liquid crystal display with birefringence compensation layers that are formed from polymer films on surfaces of a thin-film transistor layer and a color filter layer in accordance with an embodiment of the present invention.

In the example of FIG. 16, compensation layers 170L and 170U are formed from a polymer material (e.g., a polystyrene film, a polysulfone material, a thermoplastic polymer such as polymethyl methacrylate (PMMA) or other suitable polymer materials). Polymer birefringence compensation layers of this type may have a thickness between 0.1 mm and 0.6 mm, between 0.05 mm and 0.3 mm, between 0.05 mm and 0.4 mm, between 0.3 mm and 0.6 mm, less than 1 mm, or greater than 1 micron (as examples).

Polymer birefringence compensation layers of the type shown in FIG. 16 may, if desired, have a stress-optic coefficient, a thickness, and a Young's modulus configured to generate changes in polarization of light 44 that compensate for changes in the polarization of light 44 by layer 56 and/or layer 58 when layer 56 and/or layer 58 are stressed.

As examples, layers 56 and 58 may have a stress-optic coefficient of between 3.0 Brewster and 3.6 Brewster and a Young's modulus of between 65 gigapascal (GPa) and 85 GPa. In one suitable example, polymer compensation layers 170U and 170L may be formed from polystyrene layers having a stress-optic coefficient of between −45 Brewster and −65 Brewster and a Young's modulus of between 3.0 GPa and 3.6 GPa. In another example, polymer compensation layers 170U and 170L may be formed from polysulfone layers having a stress-optic coefficient of between −45 Brewster and −65 Brewster and a Young's modulus of between 2.0 GPa and 10 GPa. In a third example, polymer compensation layers 170U and 170L may be formed from PMMA materials having a stress-optic coefficient of between −1 Brewster and −4.5 Brewster and a Young's modulus of between 1.0 GPa and 4.0 GPa. In general, polymer compensation layers such as polymer compensation layers 170U and 170L may have a negative photo-elastic constant that is less than −10 Brewster and a Young's modulus that is smaller than 40 GPa.

The example of FIG. 16 in which display 14 includes two polymer birefringence compensation layers is merely illustrative. If desired, display 14 may be provided with a single polymer birefringence compensation layer such as a selected one of polymer compensation layers 170U and 170L of FIG. 16.

The foregoing is merely illustrative of the principles of this invention and various modifications can be made by those skilled in the art without departing from the scope and spirit of the invention.

What is claimed is:

1. A display, comprising:
an upper polarizer;
a lower polarizer;
a liquid crystal layer;
a first glass layer interposed between the upper polarizer and the liquid crystal layer;
a second glass layer interposed between the lower polarizer and the liquid crystal layer; and
a third glass layer located between the upper polarizer and the first glass layer that is configured to compensate for stress-induced birefringence in the first and second transparent layers.

2. The display defined in claim 1 wherein the first glass layer comprises a color filter layer.

3. The display defined in claim 2 wherein the second glass layer comprises a thin-film transistor layer.

4. The display defined in claim 3 wherein the third glass layer is attached to the color filter layer.

5. The display defined in claim 4, further comprising a fourth glass layer attached to the thin-film transistor layer.

6. The display defined in claim 1, further comprising a fourth glass layer located between the upper polarizer and lower polarizer.

7. The display defined in claim 1 wherein the third glass layer has a negative photo-elastic constant.

8. The display defined in claim 7 wherein the negative photo-elastic constant has a value of less than −3.0 Brewster.

9. A display, comprising:
an upper polarizer;
a lower polarizer;
a liquid crystal layer;
a first glass layer having a positive photo-elastic constant interposed between the upper polarizer and the liquid crystal layer;
a second glass layer interposed between the lower polarizer and the liquid crystal layer;
a first polymer layer having a negative photo-elastic constant interposed between the upper polarizer and the first glass layer; and
a second polymer layer interposed between the lower polarizer and the second glass layer.

10. The display defined in claim 9 wherein the first polymer layer comprises a polymer material selected from the group consisting of: polystyrene, polysulfone, and polymethyl methacrylate.

11. The display defined in claim 9 wherein the second polymer layer has a negative photo-elastic constant.

12. The display defined in claim 11 wherein the second glass layer has a positive photo-elastic constant.

13. The display defined in claim 11 wherein the negative photo-elastic constant of each of the first and second polymer layers is less than −10 Brewster.

14. The display defined in claim 13 wherein the first and second polymer layers each have a Young's modulus that is less than 30 GPa.

15. The display defined in claim 11 wherein the first glass layer comprises a color filter layer.

16. The display defined in claim 15 wherein the first polymer layer is formed on the color filter layer.

17. A display, comprising:
a first polarizer;
a second polarizer;
a liquid crystal layer;
a first transparent layer interposed between the first polarizer and the liquid crystal layer;
a second transparent layer interposed between the second polarizer and the liquid crystal layer;
a birefringence compensation layer located between the second transparent layer and the second polarizer that is configured to compensate for stress-induced birefringence in the first and second transparent layers; and adhesive material that attaches the birefringence compensation layer to the second transparent layer, wherein the adhesive material forms a rectangular ring of adhesive between the birefringence compensation layer and the second transparent layer.

18. The display defined in claim 17 wherein the first transparent layer comprises a glass color filter layer and wherein the second transparent layer comprises a glass thin-film transistor layer.

19. The display defined in claim 18 wherein the birefringence compensation layer comprises glass.

20. The display defined in claim 19, wherein the adhesive material comprises a layer of optically clear adhesive material that attaches the birefringence compensation layer to the glass thin-film transistor layer.

21. The display defined in claim 18 wherein the birefringence compensation layer comprises polymer material.

22. The display defined in claim 17, further comprising an additional birefringence compensation layer located between the first transparent layer and the first polarizer.

* * * * *